United States Patent
Tarkiainen

(10) Patent No.: US 9,475,397 B2
(45) Date of Patent: Oct. 25, 2016

(54) ELECTRONIC POWER CONVERTER FOR A MOBILE WORKING MACHINE

(71) Applicant: Visedo Oy, Lappeenranta (FI)

(72) Inventor: Antti Tarkiainen, Lappeenranta (FI)

(73) Assignee: VISEDO OY, Lappeenranta (FI)

(*) Notice: Subject to any disclaimer, the term of this patent is extended or adjusted under 35 U.S.C. 154(b) by 38 days.

(21) Appl. No.: 14/165,768

(22) Filed: Jan. 28, 2014

(65) Prior Publication Data
US 2015/0210169 A1    Jul. 30, 2015

(51) Int. Cl.
  *H02P 9/00*    (2006.01)
  *B60L 11/14*   (2006.01)
  *B60L 11/12*   (2006.01)

(52) U.S. Cl.
  CPC ............ *B60L 11/14* (2013.01); *B60L 11/12* (2013.01); *B60L 2200/40* (2013.01); *B60L 2240/547* (2013.01); *B60L 2240/549* (2013.01); *Y02T 10/7005* (2013.01); *Y02T 10/7077* (2013.01)

(58) Field of Classification Search
  CPC .......................... B60L 2240/44; F03D 5/02
  USPC ............... 290/45, 40 B, 40 D; 322/44, 20; 307/10.1
  See application file for complete search history.

(56) References Cited

U.S. PATENT DOCUMENTS

| | | | |
|---|---|---|---|
| 5,568,023 A * | 10/1996 | Grayer et al. | 318/139 |
| 6,380,715 B1 | 4/2002 | Kubo | |
| 2003/0039130 A1* | 2/2003 | Curtiss | 363/37 |
| 2005/0146308 A1* | 7/2005 | Quazi et al. | 322/28 |
| 2006/0044846 A1* | 3/2006 | Hjort et al. | 363/34 |
| 2007/0064363 A1* | 3/2007 | Nielsen et al. | 361/90 |
| 2011/0054726 A1* | 3/2011 | Noumura | 701/22 |
| 2011/0316340 A1* | 12/2011 | Nakano et al. | 307/43 |
| 2012/0081936 A1* | 4/2012 | Walters | 363/80 |

FOREIGN PATENT DOCUMENTS

| | | |
|---|---|---|
| CN | 201956916 | 8/2011 |
| EP | 2230753 | 5/2013 |

(Continued)

OTHER PUBLICATIONS

European Search Report, dated Apr. 23, 2013, from corresponding EP application.

(Continued)

*Primary Examiner* — Julio C. Gonzalez Ramirez
(74) *Attorney, Agent, or Firm* — Young & Thompson

(57) ABSTRACT

An electronic power converter includes a storage circuit (101) capable of storing electrical energy that is determined by an electrical quantity, voltage or current, of the storage circuit. The electronic power converter includes an electronic power converter stage (102) connected to the storage circuit and a regulator (103) for controlling the electronic power converter stage to regulate the electrical quantity at least partly on the basis of deviation of the electrical quantity from its reference level. The regulator is configured to weight the deviation with a first gain coefficient when the deviation is positive, and to weight the deviation with a second gain coefficient when the deviation is negative. The first gain coefficient has a value different from that of the second gain coefficient because the reference level is typically not in the middle of the allowed range of variation of the electrical quantity.

14 Claims, 4 Drawing Sheets

(56) References Cited

FOREIGN PATENT DOCUMENTS

| | | |
|---|---|---|
| JP | 07231649 A | 8/1995 |
| JP | 2003037939 A | 2/2003 |

OTHER PUBLICATIONS

Chinese search report, dated Oct. 27, 2015; Application No. 2013010412570.7.

* cited by examiner

ELECTRONIC POWER CONVERTER FOR A MOBILE WORKING MACHINE

FIELD OF THE INVENTION

The invention relates to an electronic power converter suitable for an electromechanical power transmission chain of a mobile working machine. The invention relates also to a method and to a computer program for controlling an electronic power converter. Furthermore, the invention relates to a mobile working machine comprising an electromechanical power transmission chain.

BACKGROUND

An electromechanical power transmission chain comprises typically one or more electrical machines and an electronic power converter. The electromechanical power transmission chain can be a series transmission chain where one of the electrical machines operates as generator and the electronic power converter is arranged to convert the electrical voltages produced by the generator into electrical voltages having amplitudes and frequencies suitable for the one or more other electrical machines. The generator can be driven with a combustion engine that can be e.g. a diesel engine, an Otto-cycle engine, or a turbine engine. The other electrical machines can be, for example, electrical motors in wheels of a mobile working machine. The electronic power converter comprises typically an intermediate circuit, an electronic power converter stage between the generator and the intermediate circuit and one or more other electronic power converter stages between the intermediate circuit and the other electrical machines. It is also possible that the electromechanical power transmission chain is a parallel transmission chain where an electrical machine that is mechanically connected to a combustion engine operates sometimes as a generator which charges one or more energy-storages and sometimes as a motor that receives electrical energy from the one or more energy-storages and assists the combustion engine when high mechanical output power is needed. In this case, the electronic power converter comprises typically an intermediate circuit, an electronic power converter stage between the generator and the intermediate circuit, and one or more electronic power converter stages between the intermediate circuit and the one or more energy-storages.

The above-mentioned intermediate circuit is typically a capacitive circuit capable of storing electrical energy. In order that the electronic power converter stages of the electronic power converter would be able to operate properly, the voltage of the intermediate circuit needs to be between appropriate lower and upper limits which can be, for example, 300 V and 750 V, respectively. The electrical energy stored by the intermediate circuit is directly proportional to the square of the voltage of the intermediate circuit. In many cases, the reference level of the voltage of the intermediate circuit is advantageously chosen so that electrical energy corresponding to the reference level of the voltage is in the middle between electrical energy corresponding to the lower limit of the voltage and electrical energy corresponding to the upper limit of the voltage. Due to the above-mentioned square-dependency, the reference level of the voltage is not in the middle between the upper and lower limits of the voltage. For example, in the above-mentioned exemplifying case, where the lower and upper limits are 300 V and 750 V, respectively, the reference level of the voltage is about 571 V. Thus, there is a 271 V safety margin between the reference level and the lower limit but only a 179 V safety margin between the reference level and the upper limit. An inconveniency related to the asymmetry of these safety margins is that it complicates the control of the voltage of the intermediate circuit. A similar inconveniency is present also in conjunction with inductive intermediate circuits because the electrical energy stored by an inductive intermediate circuit is directly proportional to the square of the current of the intermediate circuit. It is naturally possible to use the square of the capacitor voltage or the square of the inductor current as a control quantity but, in this case, the square-type non-linearity is included in the control quantity, which in turn may complicate the control.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention, there is provided a new electronic power converter that is suitable for an electromechanical power transmission chain of a mobile working machine. The electronic power converter according to the invention comprises:

- a storage circuit capable of storing electrical energy, the stored electrical energy being determined by an electrical quantity related to the storage circuit,
- an electronic power converter stage connected to the storage circuit, and
- a regulator for controlling the electronic power converter stage to regulate the electrical quantity at least partly on the basis of deviation of the electrical quantity from its reference level.

The regulator is configured to weight the deviation with a first gain coefficient when the deviation is positive, and to weight the deviation with a second gain coefficient when the deviation is negative, where the first gain coefficient has a value different from that of the second gain coefficient so as to enable asymmetrical control.

The above-mentioned storage circuit can be a capacitive circuit and the electrical quantity can be, for example, the voltage of the capacitive circuit, the square of the voltage of the capacitive circuit, or some other suitable function of the said voltage. It is also possible that the storage circuit is an inductive circuit and the electrical quantity can be, for example, the current of the inductive circuit, the square of the current of the inductive circuit, or some other suitable function of the said current.

As the gain coefficient used on the upper safety margin between the reference level and an upper limit of the electrical quantity can have a value different from that of the gain coefficient used on the lower safety margin between the reference level and a lower limit of the electrical quantity, the regulator can be tuned more freely to provide desired operation especially in cases where the safety margins are asymmetric and/or a non-linear function, e.g. the square-function, is used for constructing the electrical quantity being regulated. The gain coefficient that is used on the narrower one of the safety margins has preferably a bigger value than the gain coefficient that is used on the wider one of the safety margins. The gain coefficient having the bigger value facilitates keeping the electrical quantity on the narrower safety margin whereas the gain coefficient having the smaller value improves the stability of the control compared to a situation where the gain coefficient having the bigger value would be used on both of the safety margins.

The electronic power converter stage can be, for example, an inverter stage suitable for transferring electrical power between an alternating current machine and a capacitive or inductive energy storage circuit, or a controllable direct voltage converter suitable for transferring electrical power between a direct current machine and a capacitive or inductive energy storage circuit.

In accordance with the second aspect of the invention, there is provided a new method for controlling an electronic power converter. The method according to the invention comprises controlling an electronic power converter stage of the electronic power converter to regulate an electrical quantity related to a storage circuit of the electronic power converter at least partly on the basis of deviation of the electrical quantity from its reference level, where electrical energy stored by the storage circuit is determined by the electrical quantity. The above-mentioned deviation is weighted with a first gain coefficient when the deviation is positive, and the deviation is weighted with a second gain coefficient when the deviation is negative, where the first gain coefficient has a value different from that of the second gain coefficient so as to enable asymmetrical control.

In accordance with the third aspect of the invention, there is provided a new mobile working machine. The mobile working machine comprises:
 a combustion engine, and
 an electromechanical power transmission chain between the combustion engine and one or more wheels, chain tracks, or other actuators of the mobile working machine.

The electromechanical transmission chain comprises at least one electronic power converter according to the present invention.

The mobile working machine comprises preferably a liquid cooling system arranged to cool both a hydraulic system of the mobile working machine and the electromechanical power transmission chain. The mobile working machine can be, for example, a tractor, a bucket charger, a road drag, a bulldozer, or any other working machine having wheels and/or chain tracks.

In accordance with the fourth aspect of the invention there is provided a new computer program for controlling an electronic power converter. The computer program comprises computer executable instructions for controlling a programmable processor to control an electronic power converter stage of the electronic power converter to regulate an electrical quantity related to a storage circuit of the electronic power converter at least partly on the basis of deviation of the electrical quantity from its reference level, where electrical energy stored by the storage circuit is determined by the electrical quantity. The computer program comprises computer executable instructions for controlling the programmable processor to weight the above-mentioned deviation with a first gain coefficient when the deviation is positive, and to weight the deviation with a second gain coefficient when the deviation is negative, where the first gain coefficient has a value different from that of the second gain coefficient so as to enable asymmetrical control.

A computer program product according to the invention comprises a non-volatile computer readable medium, e.g. a compact disc "CD", encoded with a computer program according to the invention.

A number of non-limiting exemplifying embodiments of the invention are described in accompanied dependent claims.

Various non-limiting exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EXEMPLIFYING EMBODIMENTS

Figure 1:
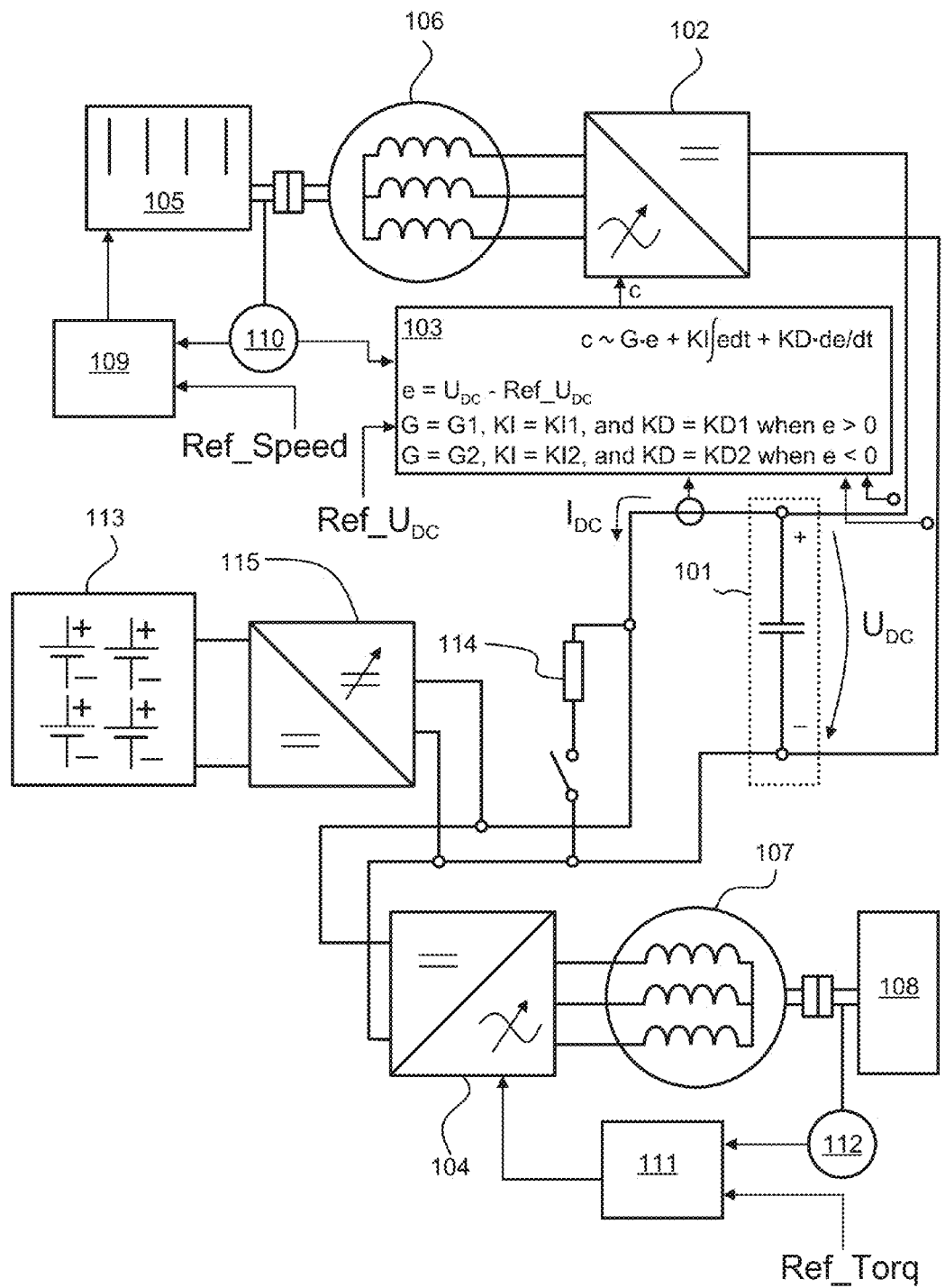
FIG. 1 shows a schematic illustration of an electromechanical power transmission chain that comprises an electronic power converter according to an exemplifying embodiment of the invention.

FIG. 1 shows a schematic illustration of an electromechanical power transmission chain that comprises an electronic power converter according to an exemplifying embodiment of the invention. The electromechanical power transmission chain comprises a generator 106 that is driven with a combustion engine 105, an electrical motor 107 that is connected to a mechanical load 108, and an electronic power converter between the generator 106 and the electrical motor 107. The electronic power converter comprises a first electronic power converter stage 102 connected to stator windings of the generator 106, a second electronic power converter stage 104 connected to stator windings of the electrical motor 107, and a storage circuit 101 capable of storing electrical energy and connected to the first and second electronic power converter stages 102 and 104. In the exemplifying case illustrated in FIG. 1, the storage circuit 101 is a capacitive intermediate circuit and the electrical energy E stored by the storage circuit 101 is directly proportional to the square of voltage $U_{DC}$, i.e. $E=\frac{1}{2}CU_{DC}^2$, where C is the capacitance of the storage circuit 101. In some other cases, the storage circuit could be an inductive intermediate circuit where the stored electrical energy is $\frac{1}{2}LI^2$, where L is the inductance of the inductive intermediate circuit and I is current of the inductive intermediate circuit. The electronic power converter comprises a regulator 103 for controlling the electronic power converter stage 102 to regulate the voltage $U_{DC}$ at least partly on the basis of deviation of the voltage $U_{DC}$ from its reference level $U_{DC}\_$Ref. The regulator 103 is configured to weight the deviation $U_{DC}-U_{DC}\_$Ref with a first gain coefficient G1 when the deviation is positive, and to weight the deviation with a second gain coefficient G2 when the deviation is negative. The first gain coefficient G1 has a value different from that of the second gain coefficient G2 so as to enable asymmetrical control of the voltage $U_{DC}$.

In the exemplifying case shown in FIG. 1, it is assumed that the combustion engine 105 is operated according to a rotational speed reference Ref_Speed. The electromechanical power transmission chain comprises a rotational speed and/or position indicator 110 and a regulator 109 for controlling the operation of the combustion engine 105 on the basis of the rotational speed reference Ref_Speed and an output signal of the indicator 110. In order to improve the accuracy of the control of stator voltages of the generator 106, the output signal of the indicator 110 can be utilized also by the regulator 103 in the control of the electronic power converter stage 102. The mechanical load 108 is assumed to be driven according to a torque reference Ref_torq and the rotational speed of the mechanical load is determined in accordance with the load torque and the moment of inertia of the rotating parts. The electromechanical power transmission chain comprises a regulator 111 for controlling the operation of the second electronic power converter stage 104 and the electrical motor 107 on the basis of the torque reference Ref_torq. In order to improve the accuracy of the torque control of the electrical motor 107, the electromechanical power transmission chain can be provided with a rotational speed and/or position indicator 112 whose output signal is utilized in the torque control of the electrical motor 107. The mechanical load 108 could as well be driven according to a rotational speed reference. The mechanical load 108 can be, for example, a wheel or another actuator of a mobile working machine. The rotational speed reference Ref_Speed of the combustion engine 105 can be arranged to be dependent on the power of the electrical motor 107 according to a predetermined rule, for example, so that the efficiently of the combustion engine 105 is optimized at each output power of the electromechanical power transmission chain.

It is to be noted that in some situations, e.g. during braking, the electrical motor 107 may operate as a generator that charges the storage circuit 101, and the generator 106 may operate as a motor that rotates the combustion engine 105 which provides engine braking. The electromechanical power transmission chain can be provided with a brake resistor 114 and/or with a battery element 113 and a controllable direct voltage converter 115 in order to eliminate or at least reduce the use of the combustion engine 105 for engine braking. Furthermore, the battery element enables recovery of braking energy and the battery element can be used for smoothing the loading of the combustion engine 105.

In an electronic power converter according to an exemplifying embodiment of the invention, the regulator 103 is configured to control the electronic power converter stage 102 to regulate the voltage $U_{DC}$ at least partly on the basis of the deviation $U_{DC}-U_{DC}\_$Ref and a time integral of the deviation. The regulator 103 can be configured to weight the deviation with the first gain coefficient G1 when the deviation is positive, to weight the deviation with the second gain coefficient G2 when the deviation is negative, to weight the time integral of the deviation with a first integration coefficient KI1 when the deviation is positive, and to weight the time integral of the deviation with a second integration coefficient KI2 when the deviation is negative. In this case, the regulator can be configured to operate as a proportional—integrating "PI"-controller whose parameters are dependent on whether the deviation $U_{DC}-U_{DC}\_$Ref is positive or negative. The values of the first gain coefficient G1 and the first integration coefficient KI1 are advantageously tuned to provide an overshoot-free control of the voltage $U_{DC}$, and the values of the second gain coefficient G2 and the second integration coefficient KI2 are tuned to provide an overshoot-free control of the voltage $U_{DC}$. The regulator 103 can be configured to control the electronic power converter stage 102 to regulate the voltage $U_{DC}$ also on the basis of the rate of change of the deviation $d(U_{DC}-U_{DC}\_$Ref$)/dt$. The regulator 103 can be configured to weight the rate of change of the deviation with a first rate coefficient KD1 when the deviation is positive, and to weight the rate of change of the deviation with a second rate coefficient KD2 when the deviation is negative. In this case, the regulator can be configured to operate as a proportional—integrating—derivative "PID"-controller whose parameters are dependent on whether the deviation $U_{DC}-U_{DC}\_$Ref is positive or negative. It is also possible that the regulator 103 is configured to operate as a proportional—derivative "PD"-controller whose parameters are dependent on whether the deviation $U_{DC}-U_{DC}\_$Ref is positive or negative.

In an electronic power converter according to an exemplifying embodiment of the invention, the regulator 103 is configured to control the electronic power converter stage 102 to regulate the voltage $U_{DC}$ also on the basis of the electrical power P transferred from the storage circuit 101 to the electronic power converter stage 104. The power can be calculated as $P=U_{DC} \times I_{DC}$, where $I_{DC}$ is the current supplied to the electronic power converter stage 104 as illustrated in FIG. 1. A feed-forward path of the control of the voltage $U_{DC}$ can be based on the power P whereas the feed-back branch of the control is based on the deviation $U_{DC}-U_{DC}\_$Ref. It is also possible that the feed-forward path of the control of the voltage $U_{DC}$ is based on the current $I_{DC}$ which discharge, or charge in a braking situation, the capacitive storage circuit 101. It is also possible that the feed-forward path of the control of the voltage $U_{DC}$ is based on the quantity $U_{DC} \times dU_{DC}/dt$ which is indicative of the rate of change of the electrical energy stored by the storage circuit 101.

Figure 2:
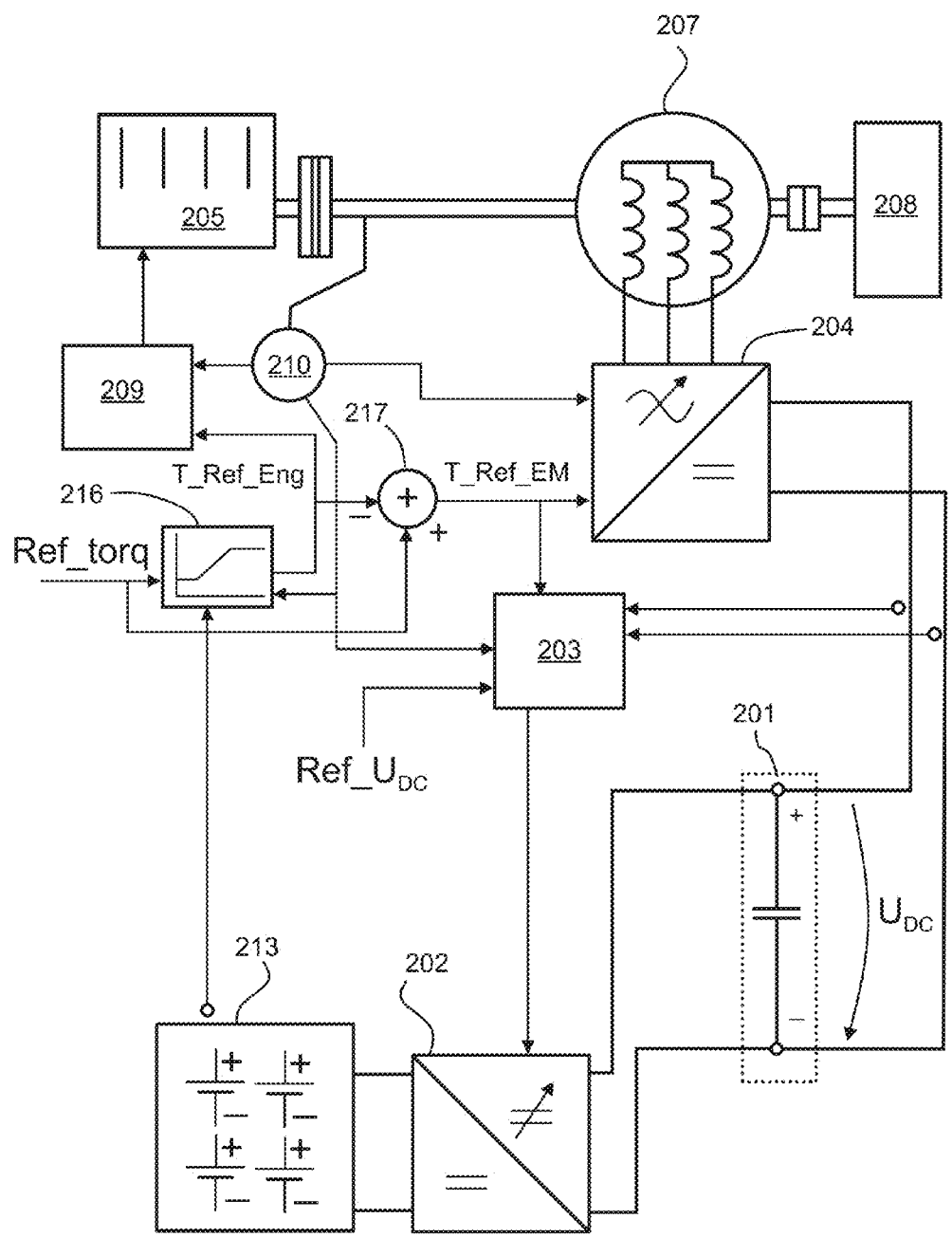
FIG. 2 shows a schematic illustration of an electromechanical power transmission chain that comprises an electronic power converter according to an exemplifying embodiment of the invention.

FIG. 2 shows a schematic illustration of an electromechanical power transmission chain that comprises an electronic power converter according to an exemplifying embodiment of the invention. The electromechanical power transmission chain comprises an electrical machine 207, a battery element 213, and an electronic power converter between the electrical machine 207 and the battery element 213. The electromechanical power transmission chain shown in FIG. 2 is a parallel transmission chain where the electrical machine 207 is mechanically connected to the combustion engine 205 and to a mechanical load 208. The electrical machine 207 operates sometimes as a generator which charges the battery element 213 and sometimes as a motor that receives electrical energy from the battery element and assists the combustion engine 205 when high mechanical output power is needed. Thus, the electromechanical power transmission chain is capable of smoothing the loading of the combustion engine 205. Furthermore, the electromechanical power transmission chain is capable of storing braking energy to the battery element. The mechanical load 208 can be, for example, a wheel or another actuator of a mobile working machine. The electronic power converter comprises a first electronic power converter stage 202 connected to the battery element 213, a second electronic power converter stage 204 connected to stator windings of the electrical machine 207, and a storage circuit 201 capable of storing electrical energy and connected to the first and second electronic power converter stages 202 and 204. In the exemplifying case illustrated in FIG. 2, the storage circuit 201 is a capacitive intermediate circuit and the electrical energy E stored by the storage circuit 201 is directly proportional to the square of voltage $U_{DC}$, i.e. $E=\frac{1}{2}CU_{DC}^{2}$, where C is the capacitance of the storage circuit 201. The electronic power converter comprises a regulator 203 for controlling the electronic power converter stage 202 to regulate the voltage $U_{DC}$ at least partly on the basis of deviation of the voltage $U_{DC}$ from its reference level $U_{DC}$_Ref. The regulator 203 is configured to weight the deviation $U_{DC}-U_{DC}$_Ref with a first gain coefficient G1 when the deviation is positive, and to weight the deviation with a second gain coefficient G2 when the deviation is negative. The first gain coefficient G1 has a value different from that of the second gain coefficient G2 so as to enable asymmetrical control of the voltage $U_{DC}$.

In the exemplifying case shown in FIG. 2, the mechanical load 208 is assumed to be driven according to a torque reference Ref_torq and the rotational speed of the mechanical load is determined in accordance with the load torque and the moment of inertia of the rotating parts. The torque reference Ref_torq is divided by functional blocks 216 and 217 into two components T_Ref_Eng and T_Ref_EM where T_Ref_Eng is the torque reference of the combustion engine 205 and T_Ref_EM is the torque reference of the electrical machine 207. The operation of the combustion engine 205 is controlled with a regulator 209 on the basis of T_Ref_Eng and an output signal of a rotational speed and/or position indicator 210. The electronic power converter stage 204 is assumed to comprise a regulator for controlling the operation of the electronic power converter stage 204 on the basis of T_Ref_EM and the output signal of the indicator 210. In the exemplifying case illustrated in FIG. 2, the division of the torque reference Ref_torq is carried out in a way that T_Ref_EM=0 when the torque reference Ref_torq is between predetermined minimum and maximum values $T_{mm}$ and $T_{max}$, T_Ref_EM=Ref_torq-$T_{max}$ when Ref_torq>$T_{max}$, and T_Ref_EM=Ref_torq-$T_{mm}$ when Ref_torq<$T_{min}$. Hence, when high torque is required, i.e. Ref_torq>$T_{max}$, T_Ref_EM is positive and thus the electrical machine 207 operates as a motor and assists the combustion engine 205, and when only low torque is required, i.e. Ref_torq<$T_{min}$, T_Ref_EM is negative and thus the electrical machine 207 operates as a generator and charges the battery element 213. The division of the torque reference Ref_torq into T_Ref_Eng and T_Ref_EM is preferably dependent on the rotational speed because the capability of the combustion engine 205 to produce high torque at low rotational speed is limited. Furthermore, the division of the torque reference Ref_torq is advantageously dependent on the state of charge of the battery element 213.

In an electronic power converter according to an exemplifying embodiment of the invention, the regulator 203 is configured to control the electronic power converter stage 202 to regulate the voltage $U_{DC}$ on the basis of also a time integral of the deviation $U_{DC}-U_{DC}$_Ref and/or the rate of change of the deviation $d(U_{DC}-U_{DC}$_Ref$)/dt$. Thus, the regulator 203 can be configured to operate as PI-, PID-, or PD-controller whose parameters are dependent on whether the deviation $U_{DC}-U_{DC}$_Ref is positive or negative.

In an electronic power converter according to an exemplifying embodiment of the invention, the regulator 203 is configured to control the electronic power converter stage 202 to regulate the voltage $U_{DC}$ also on the basis of the electrical power P transferred from the storage circuit 201 to the electronic power converter stage 204. An estimate of the power can be calculated, for example, as P=T_Ref_EM×the rotational speed. A feed-forward path of the control of the voltage $U_{DC}$ can be based on the power P whereas the feed-back branch of the control is based on the deviation $U_{DC}-U_{DC}$_Ref.

In the exemplifying cases illustrated in FIGS. 1 and 2 there are two electronic power converter stages and the storage circuit is an intermediate circuit between these two electronic power converter stages. It is to noted that the abovepresented principles for controlling voltage of a capacitive storage circuit as well as the similar principles for controlling current of an inductive storage circuit are also applicable in cases where the storage circuit is directly loaded by, for example, a DC-motor whose rotational speed is substantially constant but whose torque and thereby also current consumption are varying.

Figure 3:
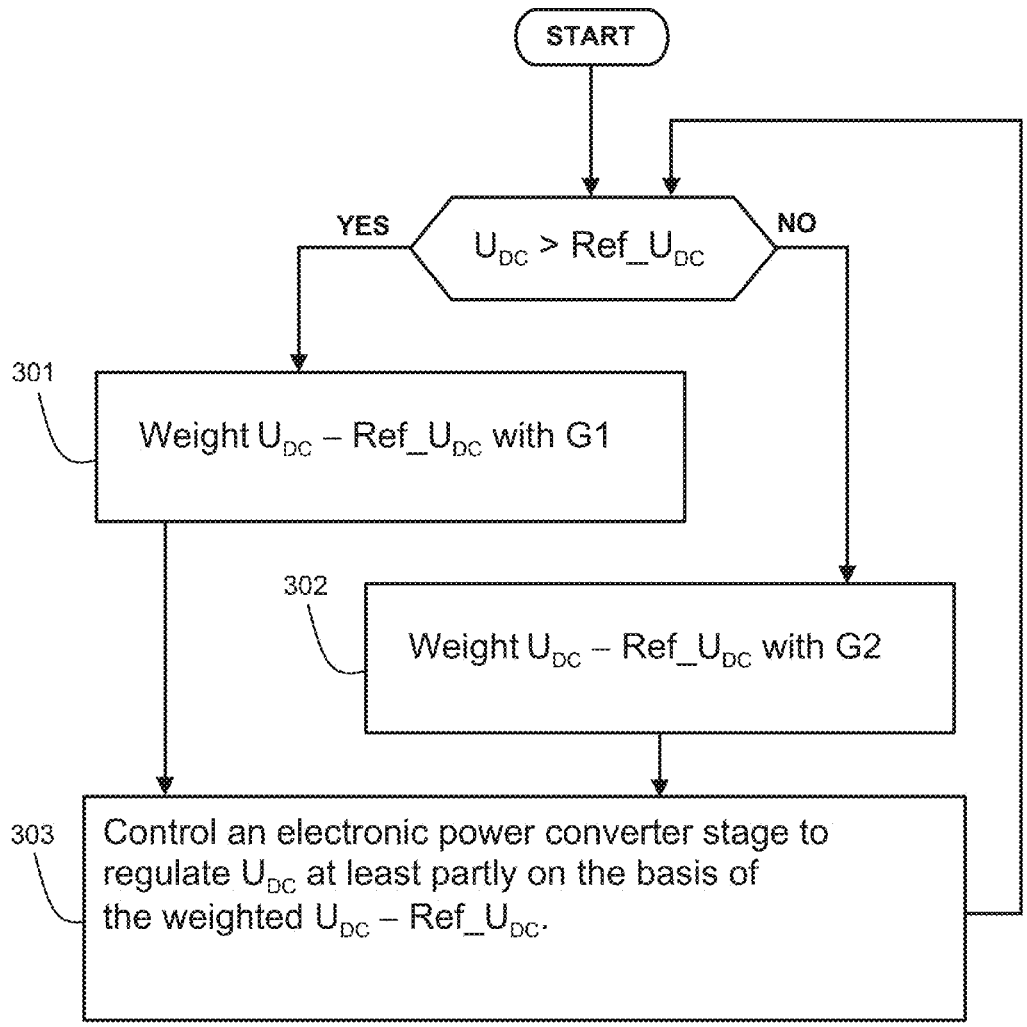
FIG. 3 shows a flow chart of a method according to an exemplifying embodiment of the invention for controlling an electronic power converter of an electromechanical power transmission chain.

FIG. 3 shows a flow chart of a method according to an exemplifying embodiment of the invention for controlling an electronic power converter. The method comprises the following actions:
- action 301: weighting a deviation of a first electrical quantity from its reference level with a first gain coefficient G1 if the deviation is positive,
- action 302: weighting the deviation with a second gain coefficient G2 if the deviation is negative,
- action 303: controlling an electronic power converter stage of the electronic power converter to regulate the first electrical quantity at least partly on the basis of the weighted deviation, wherein the electronic power converter stage is connected to a storage circuit of the electronic power converter, the electrical energy stored by the storage circuit is determined by the first electrical quantity, and the first gain coefficient has a value different from that of the second gain coefficient.

In a method according to an exemplifying embodiment of the invention, the storage circuit is a capacitive circuit and the first electrical quantity is the voltage $U_{DC}$ of the capacitive circuit.

In a method according to another exemplifying embodiment of the invention, the storage circuit is an inductive circuit and the first electrical quantity is the current of the inductive circuit.

A method according to an exemplifying embodiment of the invention comprises controlling the electronic power converter stage to regulate the first electrical quantity at least partly on the basis of a time integral of the deviation.

A method according to an exemplifying embodiment of the invention comprises weighting the time integral of the deviation with a first integration coefficient if the deviation is positive, and weighting the time integral of the deviation with a second integration coefficient if the deviation is negative, where the first integration coefficient has a value different from that of the second integration coefficient.

In a method according to an exemplifying embodiment of the invention, the values of the first gain coefficient and the first integration coefficient are arranged to provide an overshoot-free control of the first electrical quantity, and the values of the second gain coefficient and the second integration coefficient are arranged to provide an overshoot-free control of the first electrical quantity.

A method according to an exemplifying embodiment of the invention comprises controlling the electronic power converter stage to regulate the first electrical quantity at least partly on the basis of the rate of change of the deviation.

A method according to an exemplifying embodiment of the invention comprises weighting the rate of change of the deviation with a first rate coefficient if the deviation is positive, and weighting the rate of change of the deviation with a second rate coefficient if the deviation is negative, where the first rate coefficient has a value different from that of the second rate coefficient.

A method according to an exemplifying embodiment of the invention comprises controlling the electronic power converter stage to regulate the first electrical quantity at least partly on the basis of electrical power transferred between the storage circuit and an electrical system loading the electronic power converter.

A method according to another exemplifying embodiment of the invention comprises controlling the electronic power converter stage to regulate the first electrical quantity at least partly on the basis of a second electrical quantity whose product with the first electrical quantity is electrical power transferred between the storage circuit and an electrical system loading the electronic power converter. In a case where the storage circuit is a capacitive circuit, the first electrical quantity is the voltage of the storage circuit and the second electrical quantity is current corresponding to the electrical power transferred between the storage circuit and the electrical system loading the electronic power converter, e.g. $I_{DC}$ shown in FIG. 1. In a case where the storage circuit is an inductive circuit, the first electrical quantity is the current of the storage circuit and the second electrical quantity is voltage corresponding to the electrical power transferred between the storage circuit and the electrical system loading the electronic power converter.

A computer program according to an exemplifying embodiment of the invention for controlling an electronic power converter comprises computer executable instructions for controlling a programmable processor to carry out a method according to any of the above-described exemplifying embodiments of the invention.

A computer program according to an exemplifying embodiment of the invention comprises software modules for controlling an electronic power converter. The software modules comprise computer executable instructions for controlling the programmable processor to:
    weight a deviation of a first electrical quantity from its reference level with a first gain coefficient G1 if the deviation is positive,
    weight the deviation with a second gain coefficient G2 if the deviation is negative, and
    control an electronic power converter stage of the electronic power converter to regulate the first electrical quantity at least partly on the basis of the weighted deviation,
wherein the electronic power converter stage is connected to a storage circuit of the electronic power converter, electrical energy stored by the storage circuit is determined by the first electrical quantity, and the first gain coefficient has a value different from that of the second gain coefficient.

The software modules can be, for example, subroutines and functions generated with a suitable programming language.

A computer program product according to an exemplifying embodiment of the invention comprises a non-volatile computer readable medium, e.g. a compact disc "CD", encoded with the above-mentioned software modules.

A signal according to an exemplifying embodiment of the invention is encoded to carry information defining a computer program according to an embodiment of the invention.

Figure 4:
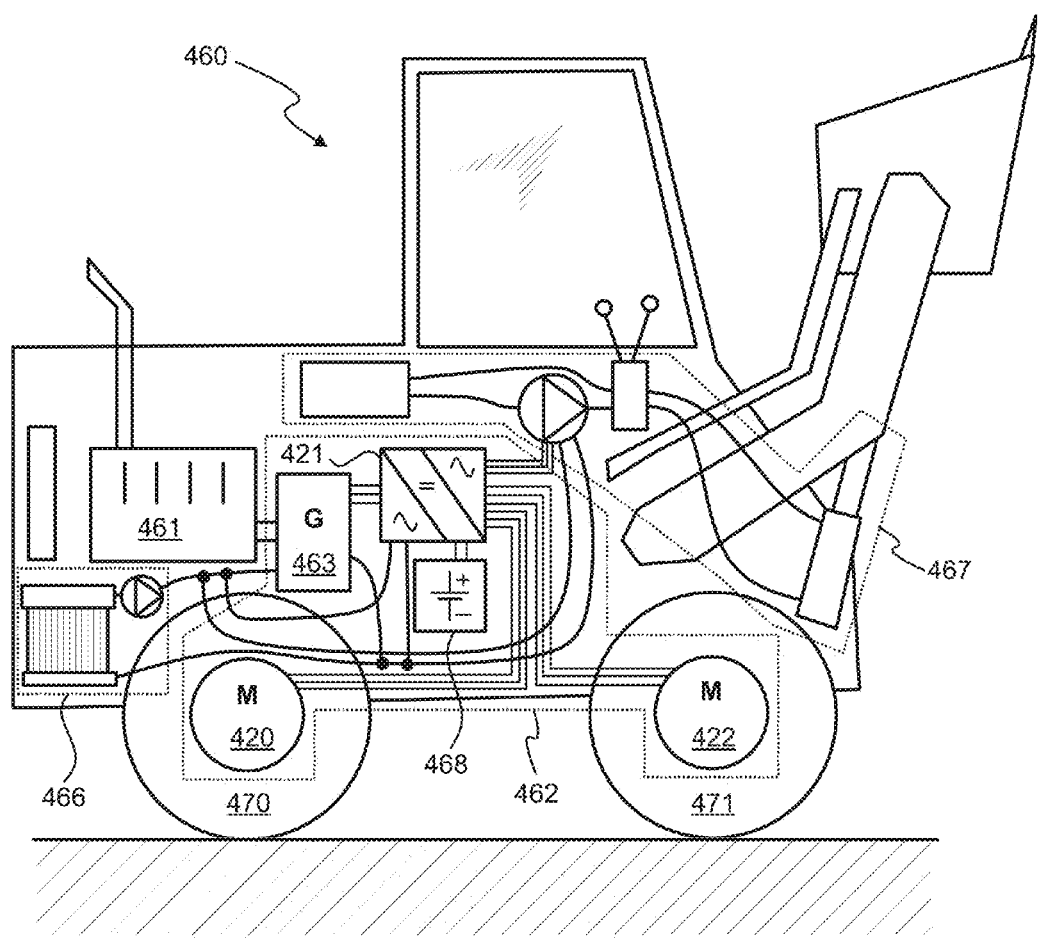
FIG. 4 shows a schematic illustration of a mobile working machine according to an exemplifying embodiment of the invention.

FIG. 4 shows a schematic illustration of a mobile working machine 460 according to an exemplifying embodiment of the invention. In this exemplifying case, the mobile working machine is a bucket charger but the mobile working machine could as well be a tractor, a road drag, a bulldozer, or any other working machine having wheels and/or chain tracks. The mobile working machine comprises a combustion engine 461 that can be e.g. a diesel engine, an Otto-cycle engine, or a turbine engine. The mobile working machine comprises an electromechanical power transmission chain 462 between the combustion engine 461 and wheels 470, 471 of the mobile working machine. The electromechanical transmission chain comprises a generator 463 the rotor of which is connected to the shaft of the combustion engine 461. The electromechanical transmission chain comprises an electronic power converter 421 and electrical motors 420, 422 at the hubs of the wheels 470, 471. The electronic power converter 421 is arranged to convert the electrical voltage produced by the generator 463 into electrical voltages having amplitudes and frequencies suitable for the electrical motors 420, 422. The electronic power converter 421 comprises:
    a storage circuit capable of storing electrical energy and operating as an intermediate circuit of the electronic power converter, the stored electrical energy being determined by an electrical quantity, e.g. voltage, related to the storage circuit,
    a first electronic power converter stage connected between the generator 463 and the storage circuit,
    a regulator for controlling the first electronic power converter stage to regulate the first electrical quantity at least partly on the basis of deviation of the first electrical quantity from its reference level, and
    second electronic power converter stages connected between the storage circuit and the electrical motors 420, 422.

The above-mentioned regulator is configured to weight the deviation with a first gain coefficient when the deviation is positive, and to weight the deviation with a second gain coefficient when the deviation is negative, where the first gain coefficient has a value different from that of the second gain coefficient so as to enable asymmetrical control.

A mobile working machine according to an exemplifying embodiment of the invention comprises a liquid cooling system 466 arranged to cool the electromechanical power transmission chain 462.

A mobile working machine according to an exemplifying embodiment of the invention comprises a liquid cooling system arranged to cool both a hydraulic system 467 of the mobile working machine and the electromechanical power transmission chain 462.

A mobile working machine according to an exemplifying embodiment of the invention comprises a liquid cooling system arranged to cool both the electromechanical power transmission chain 462 and the combustion engine 461.

In a mobile working machine according to an exemplifying embodiment of the invention, the electromechanical power transmission chain 462 comprises a battery and/or a capacitive energy storage 468 arranged to respond to peak power needs exceeding the maximum power of the combustion engine 461. The battery and/or the capacitive energy storage can be connected to the storage circuit of the electronic power converter 421 with the aid of a controllable direct voltage converter.

The specific examples provided in the description given above should not be construed as limiting the applicability and/or interpretation of the appended claims.

What is claimed is:

1. An electronic power converter for an electromechanical power transmission chain of a mobile working machine, the electronic power converter comprising:
a storage circuit capable of storing electrical energy, the stored electrical energy being determined by a first electrical quantity related to the storage circuit,
a first electronic power converter stage connected to the storage circuit, and
a regulator for controlling the first electronic power converter stage to regulate the first electrical quantity at least partly on the basis of deviation of the first electrical quantity from a reference level,
wherein the regulator is configured to weight the deviation with a first gain coefficient when the deviation is positive, and to weight the deviation with a second gain coefficient when the deviation is negative, the first gain coefficient having a value different from that of the second gain coefficient so as to allow the reference level of the first electrical quantity to deviate from a middle of an allowed range of variation of the first electrical quantity.

2. An electronic power converter according to claim 1, wherein the regulator is configured to control the first electronic power converter stage to regulate the first electrical quantity at least partly on the basis of a time integral of the deviation.

3. An electronic power converter according to claim 2, wherein the regulator is configured to weight the time integral of the deviation with a first integration coefficient when the deviation is positive, and to weight the time integral of the deviation with a second integration coefficient when the deviation is negative.

4. An electronic power converter according to claim 1, wherein the regulator is configured to control the first electronic power converter stage to regulate the first electrical quantity at least partly on the basis of a rate of change of the deviation.

5. An electronic power converter according to claim 4, wherein the regulator is configured to weight the rate of change of the deviation with a first rate coefficient when the deviation is positive, and to weight the rate of change of the deviation with a second rate coefficient when the deviation is negative.

6. An electronic power converter according to claim 1, wherein the regulator is configured to control the first electronic power converter stage to regulate the first electrical quantity at least partly on the basis of electrical power transferred between the storage circuit and an electrical system loading the electronic power converter.

7. An electronic power converter according to claim 1, wherein the regulator is configured to control the first electronic power converter stage to regulate the first electrical quantity at least partly on the basis of a second electrical quantity, a product of the first and second electrical quantities being electrical power transferred between the storage circuit and an electrical system loading the electronic power converter.

8. An electronic power converter according to claim 1, wherein the electronic power converter comprises a second electronic power converter stage connected to the storage circuit, the second electronic power converter stage being configured to transfer electrical power between i) the storage circuit and ii) an electrical system loading the electronic power converter.

9. An electronic power converter according to claim 1, wherein the storage circuit is a capacitive circuit and the first electrical quantity is voltage of the capacitive circuit, the electrical energy stored by storage circuit being directly proportional to the square of the first electrical quantity.

10. An electronic power converter according to claim 1, wherein the storage circuit is a capacitive circuit and the first electrical quantity is the square of voltage of the capacitive circuit, the electrical energy stored by storage circuit being directly proportional to the first electrical quantity.

11. An electronic power converter according to claim 1, wherein the storage circuit is an inductive circuit and the first electrical quantity is current of the inductive circuit.

12. A mobile working machine comprising:
a combustion engine, and
an electromechanical power transmission chain between the combustion engine and one or more actuators of the mobile working machine,
wherein the electromechanical transmission chain comprises at least one electronic power converter that comprises:
a storage circuit capable of storing electrical energy, the stored electrical energy being determined by a first electrical quantity related to the storage circuit,
a first electronic power converter stage connected to the storage circuit, and
a regulator for controlling the first electronic power converter stage to regulate the first electrical quantity at least partly on the basis of deviation of the first electrical quantity from a reference level,
wherein the regulator is configured to weight the deviation with a first gain coefficient when the deviation is positive, and to weight the deviation with a second gain coefficient when the deviation is negative, the first gain coefficient having a value different from that of the second gain coefficient so as to allow the reference level of the first electrical quantity to deviate from a middle of an allowed range of variation of the first electrical quantity.

13. A method for controlling an electronic power converter that comprises:
a storage circuit capable of storing electrical energy, the stored electrical energy being determined by a first electrical quantity related to the storage circuit, and
a first electronic power converter stage connected to the storage circuit,
the method comprising:
controlling the first electronic power converter stage to regulate the first electrical quantity at least partly on the basis of deviation of the first electrical quantity from a reference level,
weighting the deviation with a first gain coefficient when the deviation is positive, and
weighting the deviation with a second gain coefficient when the deviation is negative, the first gain coefficient having a value different from that of the second gain coefficient so as to allow the reference level of the first electrical quantity to deviate from a middle of an allowed range of variation of the first electrical quantity.

14. A non-transitory computer readable medium encoded with a computer program for controlling an electronic power converter that comprises:

a storage circuit capable of storing electrical energy, the stored electrical energy being determined by a first electrical quantity related to the storage circuit, and a first electronic power converter stage connected to the storage circuit, the computer program comprising computer executable instructions for controlling a programmable processor to:

control the first electronic power converter stage to regulate the first electrical quantity at least partly on the basis of deviation of the first electrical quantity from a reference level, weight the deviation with a first gain coefficient when the deviation is positive, and weight the deviation with a second gain coefficient when the deviation is negative, the first gain coefficient having a value different from that of the second gain coefficient so as to allow the reference level of the first electrical quantity to deviate from a middle of an allowed range of variation of the first electrical quantity.

* * * * *